UNITED STATES PATENT OFFICE.

EDWARD KELLS AND ALBERT J. ADAMS, OF CLEVELAND, OHIO, ASSIGNORS OF ONE-THIRD TO D. A. DANGLER, OF SAME PLACE.

PROCESS OF EXTRACTING AND MIXING LINSEED-OIL.

SPECIFICATION forming part of Letters Patent No. 280,483, dated July 3, 1883.

Application filed May 15, 1883. (No specimens.)

*To all whom it may concern:*

Be it known that we, EDWARD KELLS and ALBERT J. ADAMS, of Cleveland, in the county of Cuyahoga and State of Ohio, have invented certain new and useful Improvements in Processes of Extracting and Mixing Linseed-Oil; and we do hereby declare the following to be a full, clear, and exact description of the invention, such as will enable others skilled in the art to which it pertains to make and use the same.

Our invention relates to an improvement, first, in the extraction of linseed-oil from the seed or from the meal by means of heavy cold-test carbon, usually called "neutral oil;" and, second, in the process of mixing the said oils and forming a new and useful article of manufacture.

First, to extract the linseed-oil from the seed, the seed is soaked in the aforesaid neutral oil until it is so thoroughly saturated with it that it will receive no more, after which the seed is both ground and tempered in the usual manner. In case the seed has been ground without soaking, as aforesaid, the neutral oil may be mixed with the meal under the tempering-stones preparatory to the tempering proper, after which tempering in the ordinary manner is done. Next, after the tempering, the mass is put into heaters and raised to a temperature of about 70°, more or less, and kept at this temperature for about ten minutes, more or less, after which it is sacked and pressed in the usual manner. The heavy cold-test neutral oil aforesaid is preferably the product of a process secured by Letters Patent granted to the said Kells on the 23d day of January, 1883, No. 271,080. By this process it is found—

First. That a large per cent. more of linseed-oil can be obtained than by the usual process. This result may probably be caused by the neutral oil dissolving the gummy ingredients of the flaxseed, thereby freeing more of the linseed-oil.

Second. The quantity of oil can be increased by the admixture of from twenty-five to thirty per cent. (more or less) of neutral oil, and that the two oils forming this mixture, as aforesaid, will not separate under any of the ordinary degrees of heat or cold that linseed-oil is usually subjected to, and the mixture is considered as good, if not better, in quality, for the ordinary purposes for which linseed-oil is used, than the pure linseed-oil. As the neutral oil aforesaid is cheap and may be had in abundance, the saving by the admixture aforesaid is of great commercial value. After the linseed-oil has been extracted, it may be mixed with the aforesaid neutral oil in several ways. For instance, heat the two oils to the same temperature, preferably about 90°, and when at this temperature mix them thoroughly and agitate them constantly while the mixture is cooling to 70° or lower. The cooling process may be hastened by passing the mixture through pipes surrounded by cooling agent and medium or in other ways; but the agitation in any case must be kept up until the temperature is reduced to 70° or below. If the agitation is violent and long continued, the oils may be mixed at a much lower temperature, even as low as 60°.

By means of the aforesaid processes the said neutral oil, in quantities however small, will mix with the said linseed-oil and be retained by the latter. The amount of the said neutral oil that a given quantity of linseed-oil will receive and unite with varies somewhat, according to the kind and quality of the seed that the oil was extracted from, and can only be determined with exactness by tests applied in each individual case. Usually, however, from twenty-five to thirty per cent. of the mixture is as large a quantity of the neutral oil as the linseed-oil will receive and retain.

What we claim is—

1. As a new article of manufacture, a mixture of linseed and cold-test (so-called) "neutral" carbon oil, preferably of the kind hereinbefore described, and usually of about the proportion of three parts of the former to one part of the latter, substantially as described, and for the purpose set forth.

2. The process herein described of extracting linseed-oil from the seed or meal by the aid of neutral oil, preferably of the kind hereinbefore described, and consisting of the following steps: first, if the seeds are not ground, soaking the seeds in the said neutral oil until the seeds are fully saturated with it, then grinding the seeds and tempering the mass in the usual manner, or, if the seeds have been ground, mix the neutral oil with the meal under the tempering-stone, and then temper as aforesaid, next heat the mass to about 70°, more or less, and keep it at that temperature for about ten minutes, more or less, after which the mass may be placed in sacks and pressed in the usual manner, substantially as described, and for the purpose set forth.

In testimony whereof we sign this specification, in the presence of two witnesses, this 10th day of May, 1883.

EDWARD KELLS.
ALBERT J. ADAMS.

Witnesses:
CHAS. H. DORER,
ALBERT E. LYNCH.